United States Patent
Lu (10) Patent No.: US 8,095,807 B2
(45) Date of Patent: Jan. 10, 2012

(54) METHOD AND SYSTEM FOR POWER SAVING AND STATE RETENTION IN AN ELECTRONIC DEVICE INCLUDING A VARIATION TABLE HAVING A PLURALITY OF FLAGS

(75) Inventor: Kuo-Cheng Lu, Hsinchu (TW)

(73) Assignee: Ralink Technology Corp., Hsinchu (TW)

( * ) Notice: Subject to any disclaimer, the term of this patent is extended or adjusted under 35 U.S.C. 154(b) by 539 days.

(21) Appl. No.: 12/339,451

(22) Filed: Dec. 19, 2008

(65) Prior Publication Data
US 2009/0261871 A1    Oct. 22, 2009

(30) Foreign Application Priority Data
Apr. 17, 2008 (TW) .............................. 97113895 A (51) Int. Cl.
*G06F 1/00* (2006.01)
(52) U.S. Cl. ....................................................... 713/300
(58) Field of Classification Search .................. 713/300, 713/320
See application file for complete search history.

(56) References Cited

U.S. PATENT DOCUMENTS
4,642,760 A * 2/1987 Yanai et al. ................... 710/267
2010/0010658 A1* 1/2010 Iijima et al. ................... 700/105
* cited by examiner

*Primary Examiner* — Mohammed Rehman
(74) *Attorney, Agent, or Firm* — Convergent Law Group LLP (57) ABSTRACT

A method and a system for power saving and state retention in an electronic device are provided. The method for power saving and state retention in an electronic device includes recording a state variation of electronic components of a plurality of groups in a second circuit of the electronic device in a variation table stored in memory of a first circuit or the second circuit of the electronic device; before stopping providing power to the second circuit, selecting some groups from the plurality of groups according to the variation table and making a backup of states of electronic components of the selected groups; and after restoring power to the second circuit, restoring the states of electronic components of the selected groups according to states in the backup.

17 Claims, 7 Drawing Sheets

METHOD AND SYSTEM FOR POWER SAVING AND STATE RETENTION IN AN ELECTRONIC DEVICE INCLUDING A VARIATION TABLE HAVING A PLURALITY OF FLAGS

CROSS-REFERENCE TO RELATED APPLICATIONS

This application claims benefit of foreign priority under 35 USC §119, to Taiwan Patent Application No. 097113895, filed on Apr. 17, 2008, which is incorporated herein by reference.

BACKGROUND OF THE INVENTION

1. Field of the Invention

This invention generally relates to a method and system for power saving and state retention, and more specifically, to a method and system for power saving and state retention in an electronic device.

2. Description of Related Art

For modern portable electronic devices, such as portable multimedia players, mobile phones, and digital cameras, thin and light-weighted designs are essentially important while designing the portable electronic devices. Therefore, it is an important issue for the designers how to reduce power consumption. In a situation without an external power supply, lower power consumption also means longer usage time.

In order to save power, one of the common approaches is cutting off power on some inactive circuits of the electronic device. For instance, for a mobile phone with MP3 function, when the user is not using the MP3 function, the power supplied to the circuits in the mobile phone related to the MP3 function is temporary cut off. When the user uses the MP3 function, the power to the circuits related to the MP3 function is restored. The power of the mobile phone while user is not using the MP3 function is thereby saved, so as to achieve power-saving. The abovementioned power-saving circuit is designed generally similar to the power-saving circuit 10 shown in FIG. 1. The power-saving circuit 10 generally comprises a first circuit 12 and a second circuit 14. The first circuit 12 has a power control unit 16 and a state retention unit 18, wherein the power control unit 16 turns the power supplied to the second circuit 14 on/off according to the functional demand. At the time when the power supplied to the second circuit 14 is switched between on and off, the state retention unit 18 makes a backup of and restores states of a plurality of electronic components of the second circuit 14.

Figure 1:
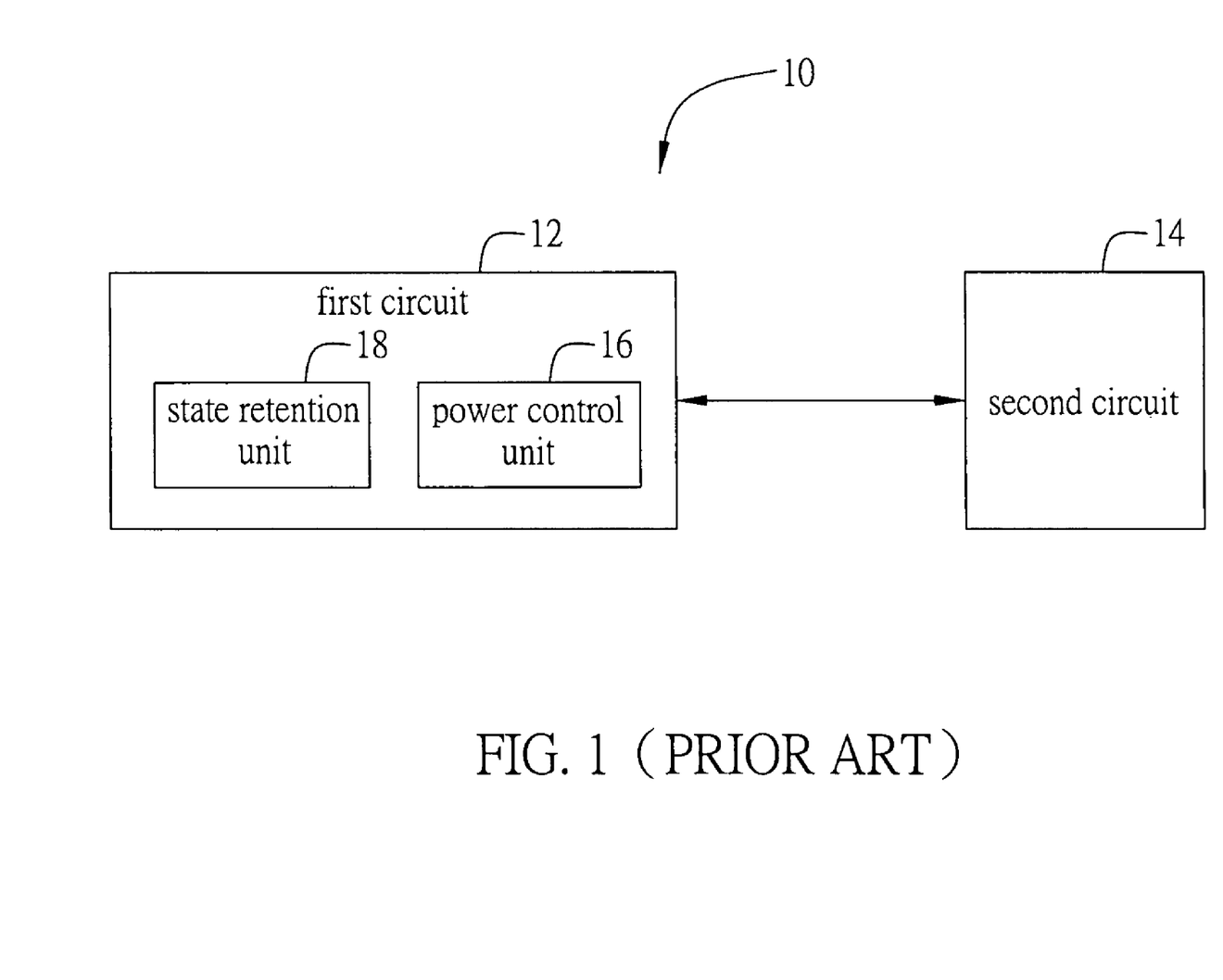
FIG. 1 is a block diagram showing a prior power-saving circuit.

In general, the conventional power-saving circuit 10 can be classified into three types. The first type of power-saving circuit applies state retention flip flop in the second circuit 14 thereof. The state retention flip flop has a feature of maintaining its state at lower power, thereby achieving power-saving. However, the first type of power-saving circuit has disadvantages such as the request of a large area for circuit layout, particular rear end program support, incapability of making a backup of the information stored in the memory, and the request to make a backup of/restore states of all electronic components. The second type of power-saving circuit utilizes scan chain that is originally allocated for testing to backup and restore states of the second circuit 14. The disadvantages of the second type of power-saving circuit are slow speed while making backup/restoring states, request of particular rear end program support, incapability of making a backup of the information stored in the memory, and the request to make backup/restore states of all electronic components. The third type of power-saving circuit stores backup of the states of the electronic components in the memory by using existing bus and decoder. The third type of power-saving circuit has disadvantages such as consumption of time and power during the restoring process, and the request to make backup/restore states of all electronic components.

SUMMARY OF THE INVENTION

In view of the disadvantages of the prior art mentioned above, the present invention provides a method for an electronic device for power saving and state retention. The electronic device comprises a first circuit, a second circuit, and a memory. The first circuit has a plurality of electronic components, and the memory has a variation table. The method comprises the steps of dividing the plurality of electronic components into a plurality of groups; detecting a state variation of the plurality of electronic components in the first circuit; recording a state variation of the electronic components in each of the groups in the first circuit, wherein the variation table has a plurality of flags corresponding to the plurality of groups; when state variation happens to the electronic component of any group, deciding if the flag value in the variation table corresponding to the group having state variation is to be changed; before stopping providing power to the first circuit, selecting some groups from the plurality of groups to be the selected groups according to the plurality of flag values in the variation table, and then making backup of states of electronic components of the selected groups; upon completing backup of states of electronic components of the selected groups, stopping providing power to the first circuit; and after restoring power supply to the first circuit, based on the backup states of electronic components, restoring states of electronic components of the selected groups to states before stopping providing power to the first circuit.

In addition, the present invention provides a system for power saving and state retention in an electronic device. The system comprises a first circuit having one or a plurality of electronic components; a second circuit having a power control unit for switching power on/off to the first circuit; and a memory having a variation table for recording state variation of electronic components of the first circuit.

Compared with the prior art, the present invention provides the method and system for power saving and state retention in an electronic device to detect if a state of electronic component is varied or not, and if the state is not varied, then after power supply is restored, the power control unit will restore the state to value varied last time. Therefore, there is no need of making a backup of states of unvaried electronic components; accordingly, the method and system of the present invention reduce time for making backup of states of electronic components, and further decrease power consumed during backup process.

BRIEF DESCRIPTION OF DRAWINGS

The present invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention; those in the art can apparently understand these and other advantages and effects after reading the disclosure of this specification. The present invention can also be performed or applied by other different embodiments. The details of the specification may be on the basis of different points and applications, and numerous modifications and variations can be devised without departing from the spirit of the present invention.

Furthermore, the following diagrams are simplified for illustrating only basic concept of the present invention, also the diagrams illustrate related components only but not depict based on component number shape, and size in practical application; in a practical application, type, number, and ratio of each component are variable, also component layout may be more complicated.

Figure 2:
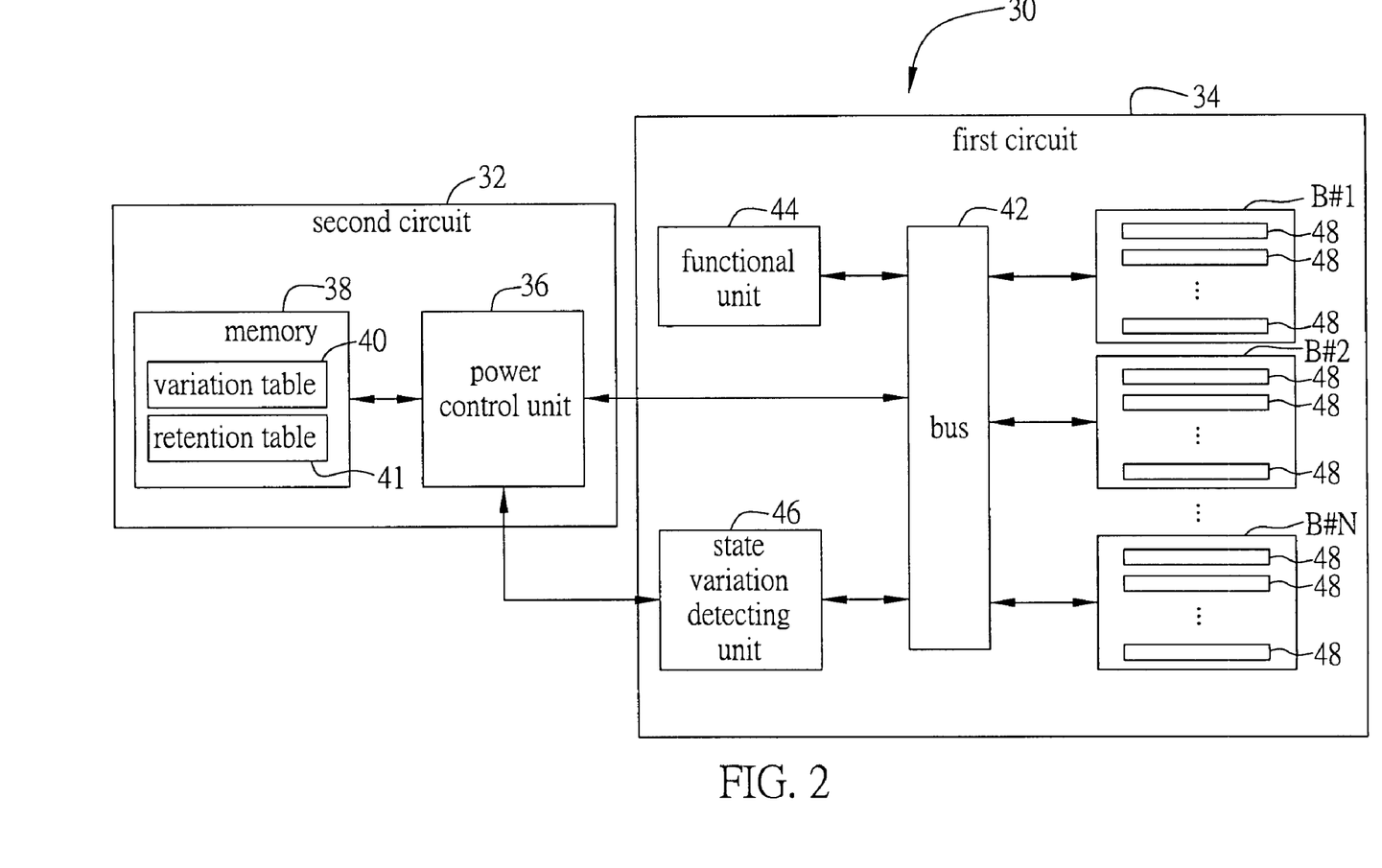
FIG. 2 is a block diagram showing a system for power saving and state retention in an electronic device according to the present invention.

Please refer to FIG. 2, which is a block diagram of the system 30 for power saving and state retention in an electronic device. In the present embodiment, the system 30 for power saving and state retention in an electronic device is formed on a silicon-based chip. The electronic device includes a second circuit 32 and a first circuit 34. While the system 30 for power saving and state retention in an electronic device is operating, the second circuit 32 is continuously provided with power, but the first circuit 34 is provided with power depending on demand. The second circuit 32 includes a power control unit 36 for switching power on/off to the first circuit 34, and a memory 38 having a variation table 40 for recording state variation of each of a plurality of groups B#1, B#2, . . . , and B#N in the first circuit 34.

The first circuit 34 includes a plurality of electronic components 48, and these the electronic components 48 include flip flop, latch, counter, and memory. In addition, the electronic components 48 are divided into a plurality of groups B#1, B#2, . . . , and B#N. Each of the groups B#1, B#2, . . . , and B#N includes at least one electronic component 48 of the plurality of electronic components 48. The first circuit 34 includes a bus 42, a functional unit 44, and a state variation detection unit 46. The bus 42 is electrically connected to the power control unit 36 of the second circuit 32 as well as the functional unit 44 and each of the groups B#1, B#2, . . . , and B#N in the first circuit 34, thereby transmitting commands and information among the power control unit 36, the functional unit 44, and each of the groups B#1, B#2, . . . , and B#N. The functional unit 44 of the first circuit 34 executes particular functional operation, such as deciphering, encryption, digital signal processing, or others. The state variation detection unit 46 is electrically connected between the power control unit 36 and the bus 42 for analyzing signals transmitted from the power control unit 36 to the plurality of electronic components and then detecting state variation of electronic components 48 of each of the groups B#1, B#2, . . . , and B#N in the first circuit 34. The state variation detection unit 46 transmits analysis outcome to the power control unit 36 of the second circuit 32, and when state variation of any electronic component 48 of any group B#1, B#2, . . . , or B#N is detected, based on analysis outcome by the state variation detection unit 46, the power control unit 36 changes flag value corresponding to the varied group B#1, B#2, . . . , or B#N in the variation table 40 inside the memory 38.

In the present embodiment, immediately after the first circuit 34 is restored with power supply, the state variation detection unit 46 begins to operate, thereby enabling the state variation detection unit 46 to detect state variation of electronic components 48 of each of the groups B#1, B#2, . . . , and B#N during the whole time when the first circuit 32 is provided with power. When a state variation of any electronic component 48 is detected, flag value in the variation table 40 corresponding to group B#1, B#2, . . . , or B#N of the varied electronic component 48 will be changed from "0" to "1". In addition, if the flag value has been previously changed to "1", then when state of another corresponding electronic component is also varied, the already changed flag value will stay as "1".

In another embodiment of the present invention, the memory 38 having the variation table 40 can be allocated to the first circuit 34. Specifically, after using the variation table 38, the power control unit 36 stops providing power to the memory 38 and consequently causes the variation table 40 to lose contents therein, but after the power control unit 36 restarts providing power to the memory 38, flag values in the variation table 40 are reset to zeros, and then continuously records the state variation.

Figure 3:
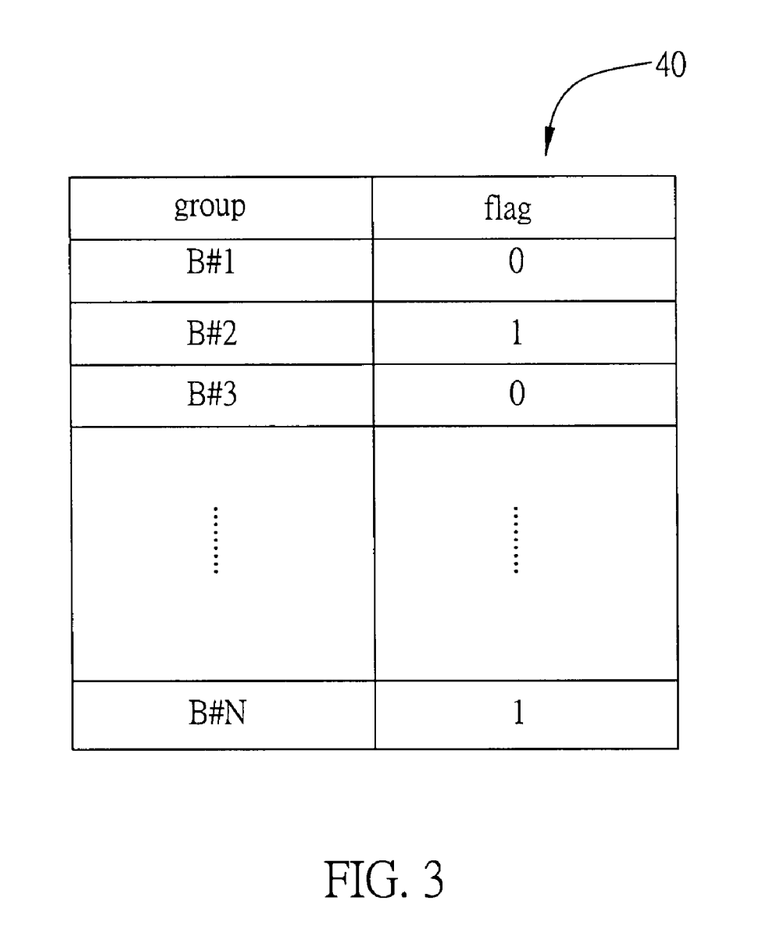
FIG. 3 is a diagram illustrating a variation table of FIG. 2.

Please refer to FIG. 3, which is a diagram illustrating the variation table of FIG. 2. The variation table includes flags, each of which is corresponding to one of the groups B#1, B#2, . . . , and B#N, and data length of each flag is a bit. Value of each the flag is changed from "0" to "1" when state of any electronic component of corresponding group B#1, B#2, . . . , or B#N is varied. For example, when the state variation detection unit 46 detects that an electronic component 48 of group B#2 is varied, and then flag value corresponding to the group B#2 is changed to "1".

Figure 4:
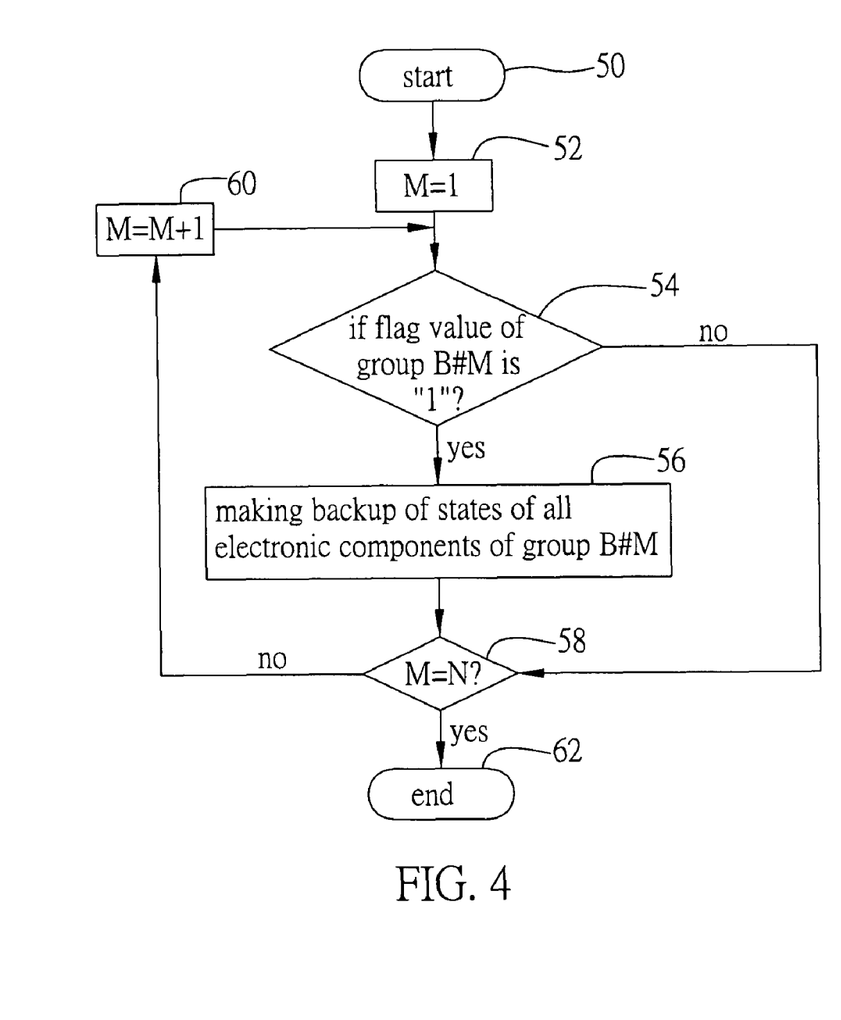
FIG. 4 is a flowchart illustrating state backup process of electronic components of groups according to the method of the present invention for power saving and state retention in an electronic device.

Please refer to FIG. 4, which is a flowchart illustrating state backup process of electronic components of groups according to the method for power saving and state retention in an electronic device in the present invention. Before the power control unit 36 of the second circuit 32 stops providing power to the first circuit 34, the power control unit 36 runs through the flow shown in FIG. 4, thereby saving states of electronic components that need a backup in the memory 38. According to the flowchart shown in FIG. 4, in steps 50 and 52, after initialization, a variable M is set to be "1". In the step 54, it is determined if flag value corresponding to group B#M is "1". If flag value of group B#M is not "1", then step 58 is performed for further determined if variable M equals to a total number N of groups in the first circuit 34. If variable M is not equal to the total number N, then step 60 is performed for adding 1 to the variable M. Otherwise, if the variable M is equal to the total number N of groups, then the process of determining state variation of electronic components of all groups has been completed, and step 62 is performed to end whole flow. In step 54, if flag value of group B#M is "1", indicating that state of at least one electronic component 48 of group B#M is varied, states of all electronic components 48 of group B#M need to be made a backup and saved in the memory 38 of the second circuit 32. Then, step 56 is performed.

In view of the above, the power control unit will only make backup of states of all electronic components 48 on any group having corresponding flag value "1" only. For any other group, if no state of electronic component 48 is varied, then the power control unit 36 makes no backup of states of electronic components 48 of the other group. It should be noted herein, for those electronic components 48 having no state variation, since the power control unit 36 restores to the state value varied last time, states of this kind unvaried electronic components 48 do not need a backup. Accordingly, compared with prior art, wherein states of all electronic components require backup, the present invention enables to backup states of selective electronic components according to outcome of pre-judging process on state variation of electronic components, thereby decreasing time and power consumed while making backup of states of electronic components.

Furthermore, according to target function, probability of being varied, location, and/or other factors of each of the electronic components, the plurality of electronic components 48 in the first circuit 34 are divided into a plurality of groups B#1, B#2, . . . , and B#N, thereby enabling electronic components 48 having same or similar character to be grouped into a same group. For instance, probability of being varied on each electronic component is analyzed, and then the plurality of electronic components 48 are divided into groups according to analysis outcome. Consequently, electronic components 48 having higher probability of being varied are grouped in a same group, while electronic components having lower probability of being varied are grouped in another group. Hence, when power supply of the first circuit is switched, total number of groups having electronic component being varied is reduced, thereby further reducing time and power consumed for making backup of states of electronic components.

It should be further stated herein, in the present embodiment, both the backup of states of electronic components 48 and the variation table 40 are stored in the memory 38; however, the present invention is not limited to as stated in the present embodiment. In other embodiments, state of each electronic component 48 and the variation table 40 can be separately stored in different memory, or state of each of the electronic component 48 can be stored in various memories.

After the power control unit 36 completes making backup of states of electronic components 48, the power control unit 36 immediate cuts off power supply to the first circuit 34, thereby saving power consumption. After restoring power supply to the first circuit 34, the power control unit 36 restores states of electronic components 48 in the first circuit 34 based on the retention table 41 saved in the memory 38.

Figure 5:
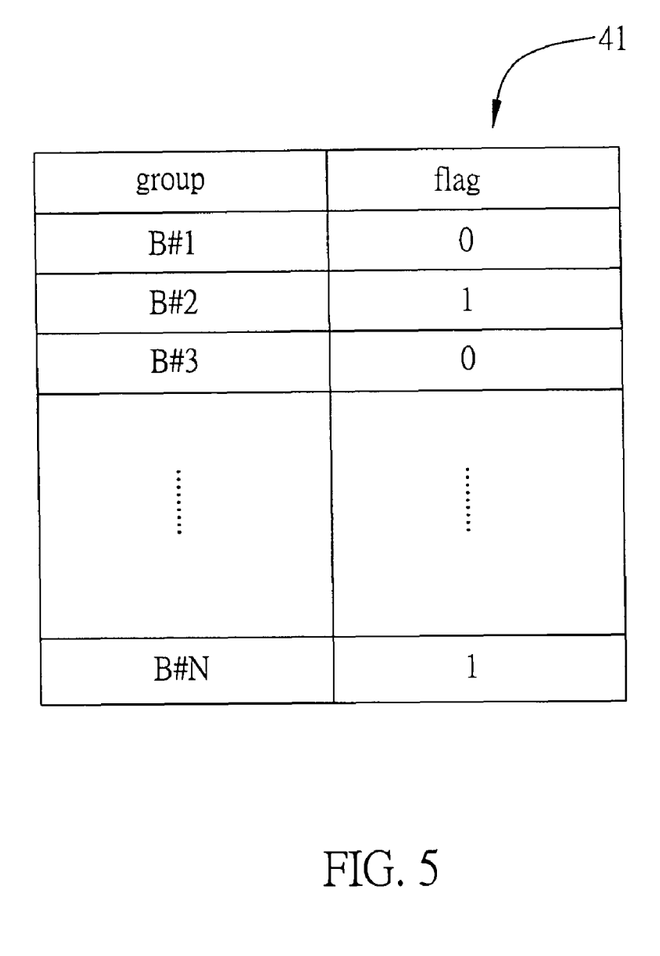
FIG. 5 is a diagram illustrating a retention table of FIG. 2.

Please refer to FIG. 5, which is a diagram illustrating the retention table 41 of the FIG. 2. Similar to the variation table 40, the retention table 41 includes flags corresponding to each of the groups B#1, B#2, . . . , and B#N, and data length of each flag is one bit. In the retention table 41, if flag value corresponding to a group is "0", states of electronic components 48 of the group do not need to be restored. Otherwise, if flag value corresponding to a group is "1", states of electronic components 48 of the group have to be restored. It should be noted herein, in the present embodiment, although the variation table 40 and the retention table 41 are separate tables, in another embodiment of the present invention, the variation table 40 and the retention table 41 can be the same table, and the power control unit 36 can use the same table for recording state variation of electronic components of each group as well as determining if state retention is required for electronic components of each of the groups.

Figure 6:
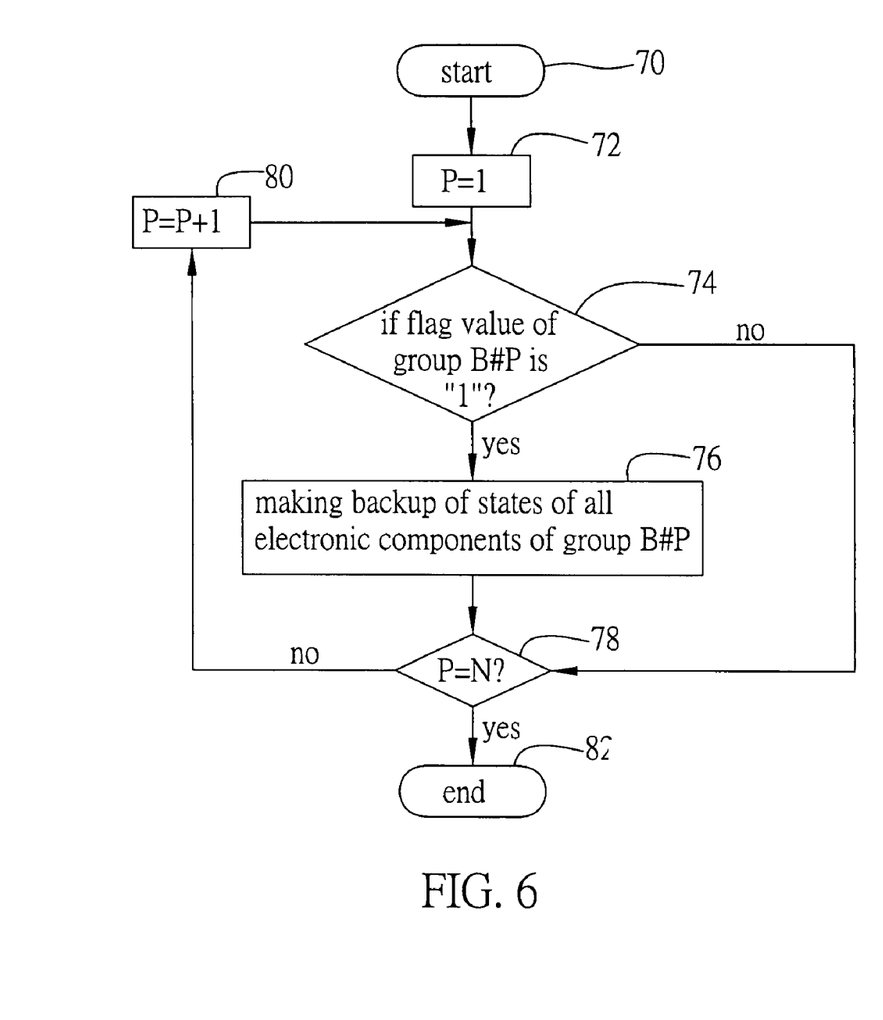
FIG. 6 is a flowchart illustrating state retention process of electronic components of groups according to the method of the present invention for power saving and state retention in an electronic device.

Please refer to FIG. 6, which is a flowchart illustrating state retention process of electronic components of groups according to the method of the present invention. As shown in the FIG. 6, after the power control unit 36 of the second circuit 32 restores power supply to the first circuit 34, the power control unit 36 immediately proceeds to the flow shown in FIG. 6, thereby restoring states of electronic components 48 requiring state retention to states before power was cut off. As shown in the flowchart, in steps 70 and 72, after initialization, a variable P is set to be "1", and then step 74 is performed for determining if flag value of group B#P is "1". If flag value of group B#P does not equal to "1", step 78 is performed for further determining if the variable P equals to a total number N of groups. If variable P does not equal to the total number N of groups, step 80 is performed for adding 1 to the variable P. Otherwise, if variable P equals to the total number N of groups, the state retention process has been completed, and step 82 is performed to end whole flow. On the other hand, in step 74, if flag value of group B#P equals to "1", states of all electronic components of the group B#P need to be restored, and subsequently, the power control unit 36 restores states of all electronic components of the group B#P according to either states of electronic components 48 of group B#P saved in the memory 38 before power supply to the first circuit 34 is cut off or built-in default value.

Accordingly, the power control unit 36 will only restore states of electronic components 48 of groups having corresponding flag value "1". Therefore, compared with the prior art, wherein states of all electronic components must be restored, the method of the present invention for power saving and state retention in an electronic device selectively restores states of electronic components, thereby decreasing time and power consumed for restoring states of electronic components.

In another embodiment of the present invention, in the state backup process of electronic components as shown in FIG. 4, a strategy-judging step is added between steps 54 and 56.

Figure 7:
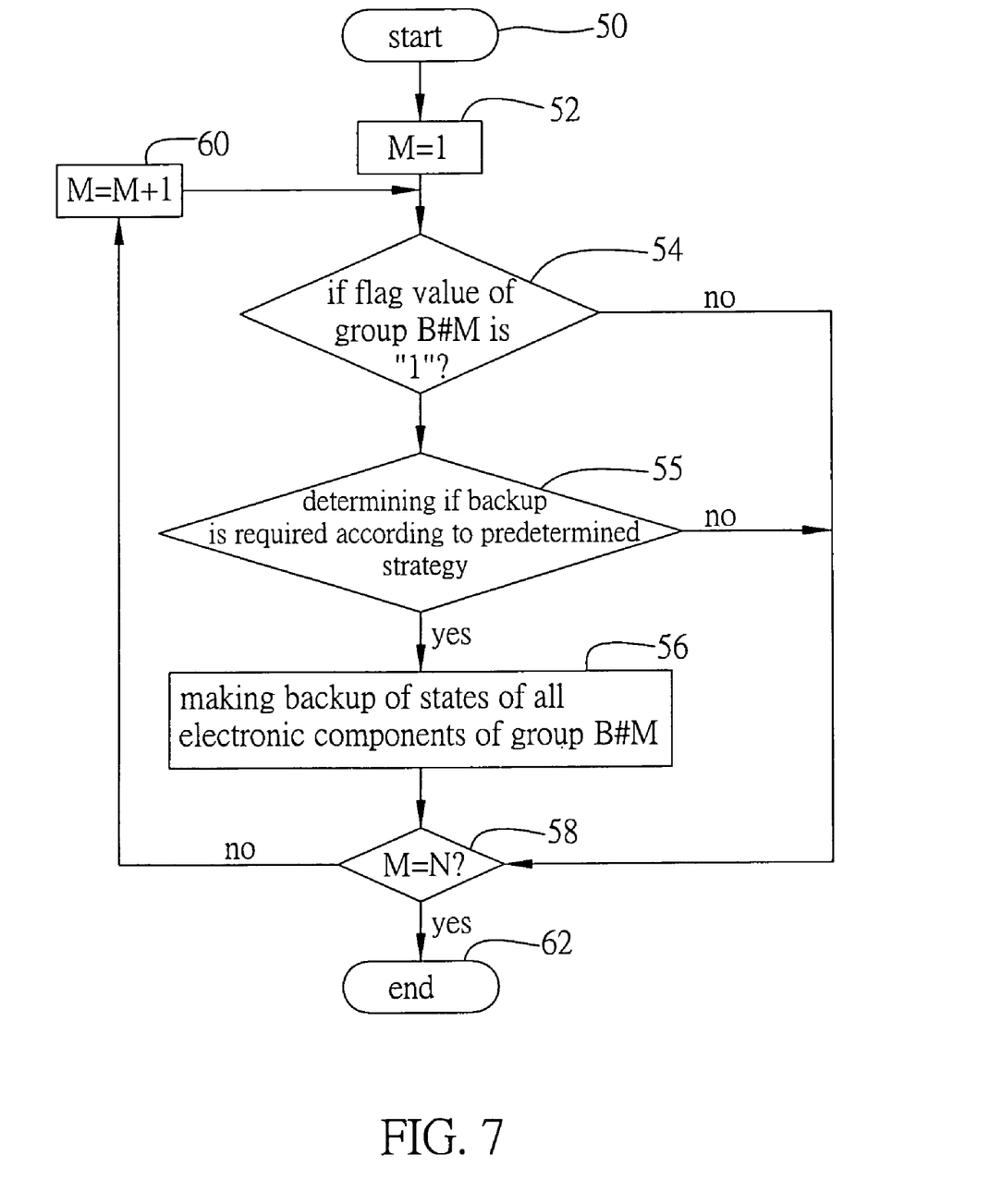
FIG. 7 is a flowchart illustrating the method of the present invention for power saving and state retention in an electronic device.

FIG. 7 is flowchart illustrating the method for power saving and state retention in an electronic device according to the present invention, wherein a strategy-judging step is included. In FIG. 7, steps 50, 52, 54, 56, 58, 60, and 62 are the same as steps 50, 52, 54, 56, 58, 60, and 62 in FIG. 4, and thus no repeated description of these steps is given, and main difference from FIG. 4 is that FIG. 7 further includes a step 55 between steps 54 and 56. In step 54, if flag value corresponding to a group B#M is judged as "1", step 55 is performed to determine if it is required to make a backup of states of all electronic components 48 of group B#M based on a predetermined strategy, wherein some situations are preset in the predetermined strategy, and in any of the situations, there is no need to backup states of electronic components 48 of group B#M even corresponding flag value is "1". If the outcome of the determination based on the predetermined strategy is that states of all electronic components 48 of group B#M need backup, step 56 is performed to make a backup. Otherwise, if the outcome of the determination based on the predetermined strategy is that states of electronic components of group B#M do not need backup, step 58 is performed. The present embodiment chiefly provides a customer-made adjustment on the whole system of the present invention.

Compared with the prior art, the method and system of the present invention for power saving and state retention in an electronic device detect if state of electronic component is varied, wherein if the state is not varied, then after power supply is restored, the power control unit will restore state to value varied last time. Hence, no backup of states of unvaried electronic components is required. Accordingly, the method and system of the present invention reduce time in backup process on states of electronic components, and further reduce power consumed during the backup process.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A method for power saving and state retention in an electronic device, wherein the electronic device comprises a first circuit having a plurality of electronic components, a second circuit and a memory having a variation table, comprising the steps of:
   dividing the plurality of electronic components into a plurality of groups;
   detecting a state variation of the electronic components of each of the groups in the first circuit;
   recording the state variation of the electronic components of each of the groups in the first circuit to the variation table, wherein the variation table comprises a plurality of flags corresponding to the plurality of groups, and when the state variation happens to the electronic components of any group, determining if a flag value in the variation table corresponding to the group with the state variation is to be changed;
   selecting a part of the plurality of groups as selected groups according to values of the plurality of flags in the variation table, and making a backup of states of the electronic components of the selected groups;
   stopping power supply to the first circuit when the backup of the states of the electronic components of the selected groups is completed;
   restoring power supply to the first circuit; and
   restoring the states of the electronic components of the selected groups to the states before stopping power supply to the first circuit based on the backup of states of the electronic components.

2. The method of claim 1, wherein the step of detecting the state variation of the electronic components of each of the groups in the first circuit includes analyzing signals transmitted to the electronic components.

3. The method of claim 1, wherein the selected groups consist of those groups having the electronic components with varied states.

4. The method of claim 1, wherein the electronic components of the first circuit include flip flop, latch, counter, and memory.

5. The method of claim 1, wherein the step of selecting a part of the plurality of groups is performed based on a predetermined strategy and the values of the plurality of flags in the variation table.

6. The method of claim 1, further comprising: providing power to the second circuit when power is not supplied to the first circuit.

7. The method of claim 1, wherein the states of the electronic components and the variation table are separately stored in different memories, or separately stored in a plurality of memories.

8. A system for power saving and state retention in an electronic device, comprising:
   a first circuit comprising a plurality of electronic components;
   a second circuit comprising a power control unit for switching power to the first circuit;
   a memory comprising a variation table for recording a state variation of the electronic components in the first circuit;
   a functional unit for operating particular functions;
   a bus electrically connected to the power control unit of the second circuit, the functional unit, and the electronic components, wherein the bus transmits commands and information among the power control unit, the functional unit, and the electronic components; and
   a state variation detection unit electrically connected to the power control unit and the bus, wherein the state variation detection unit analyzes signals transmitted from the power control unit to the electronic components, and detects if the state variation happens to the electronic components in the first circuit, and transmits the analysis outcome to the power control unit, wherein when the state variation of any one electronic component is detected, the power control unit immediately changes a flag value saved in the memory corresponding to the varied electronic components according to the analysis outcome by the state variation detection unit.

9. The system of claim 8, wherein the electronic components include flip flop, latch, counter, and memory.

10. The system of claim 8, wherein the electronic components are divided into a plurality of groups.

11. The system of claim 8, wherein the functional unit deciphers, encrypts, or processes digital signal.

12. The system of claim 8, wherein the state variation detection unit begins to operate immediately after the first circuit is provided with power and detects the state variation of the electronic components during a time period from the first circuit being provided with power till power supply to the first circuit being cut off.

13. The system of claim 12, wherein if the state variation detection unit detects that the state of any of the electronic components is varied, the flag value in the variation table corresponding to the group with the varied electronic components is changed; if the flag value is previously changed, the flag value will not be further changed.

14. The system of claim 8, wherein the states of the electronic components and the variation table are separately stored in different memories, or stored in a plurality of memories.

15. The system of claim 8, wherein the second circuit is provided with power continuously during an operation time period.

16. The system of claim 8, wherein power supply to the first circuit is turned on or off depending on a demand.

17. The system of claim 8, wherein the memory is allocated to the first circuit or the second circuit.

* * * * *